(12) United States Patent
Kobayashi

(10) Patent No.: US 11,738,805 B2
(45) Date of Patent: Aug. 29, 2023

(54) ESTIMATION DEVICE FOR ESTIMATING FRICTION COEFFICIENT OF ROAD SURFACE AND STEERING DEVICE

(71) Applicant: SUBARU CORPORATION, Tokyo (JP)

(72) Inventor: Goichi Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 315 days.

(21) Appl. No.: 17/220,594

(22) Filed: Apr. 1, 2021

(65) Prior Publication Data
US 2021/0309294 A1 Oct. 7, 2021

(30) Foreign Application Priority Data

Apr. 6, 2020 (JP) ................. 2020-068210

(51) Int. Cl.
*B62D 15/02* (2006.01)
*G01N 19/02* (2006.01)
*B60Q 9/00* (2006.01)

(52) U.S. Cl.
CPC ............. *B62D 15/025* (2013.01); *B60Q 9/00* (2013.01); *G01N 19/02* (2013.01)

(58) Field of Classification Search
CPC ........ B62D 15/025; B62D 6/006; B60Q 9/00; G01N 19/02; B60T 2210/12; B60T 8/172
See application file for complete search history.

(56) References Cited

U.S. PATENT DOCUMENTS

| 5,878,365 A * | 3/1999 | Onogi ..................... B60T 8/172 73/146 |
| 6,015,192 A * | 1/2000 | Fukumura ............... B60T 8/172 701/80 |
| 2003/0121319 A1 * | 7/2003 | Kojima ................. B60C 23/061 73/146.2 |
| 2005/0012501 A1 * | 1/2005 | Isono ..................... B60T 8/172 324/300 |
| 2008/0174083 A1 * | 7/2008 | Ersoy ....................... B60G 3/20 280/124.138 |

FOREIGN PATENT DOCUMENTS

JP 6-135214 A 5/1994
JP 2002-39744 A 2/2002

* cited by examiner

*Primary Examiner* — Behrang Badii
(74) *Attorney, Agent, or Firm* — Troutman Pepper Hamilton Sanders LLP

(57) ABSTRACT

An estimation device for estimating a friction coefficient of a road surface includes a sensor, a moment calculator, and a friction coefficient estimator. The sensor is configured to detect a force acting on a wheel. The moment calculator is configured to calculate a moment around a vertical axis at a center of a ground contact load of a tire of the wheel based on an output of the sensor. The friction coefficient estimator is configured to estimate the friction coefficient of the road surface with which the tire is in contact, based on the moment.

13 Claims, 9 Drawing Sheets

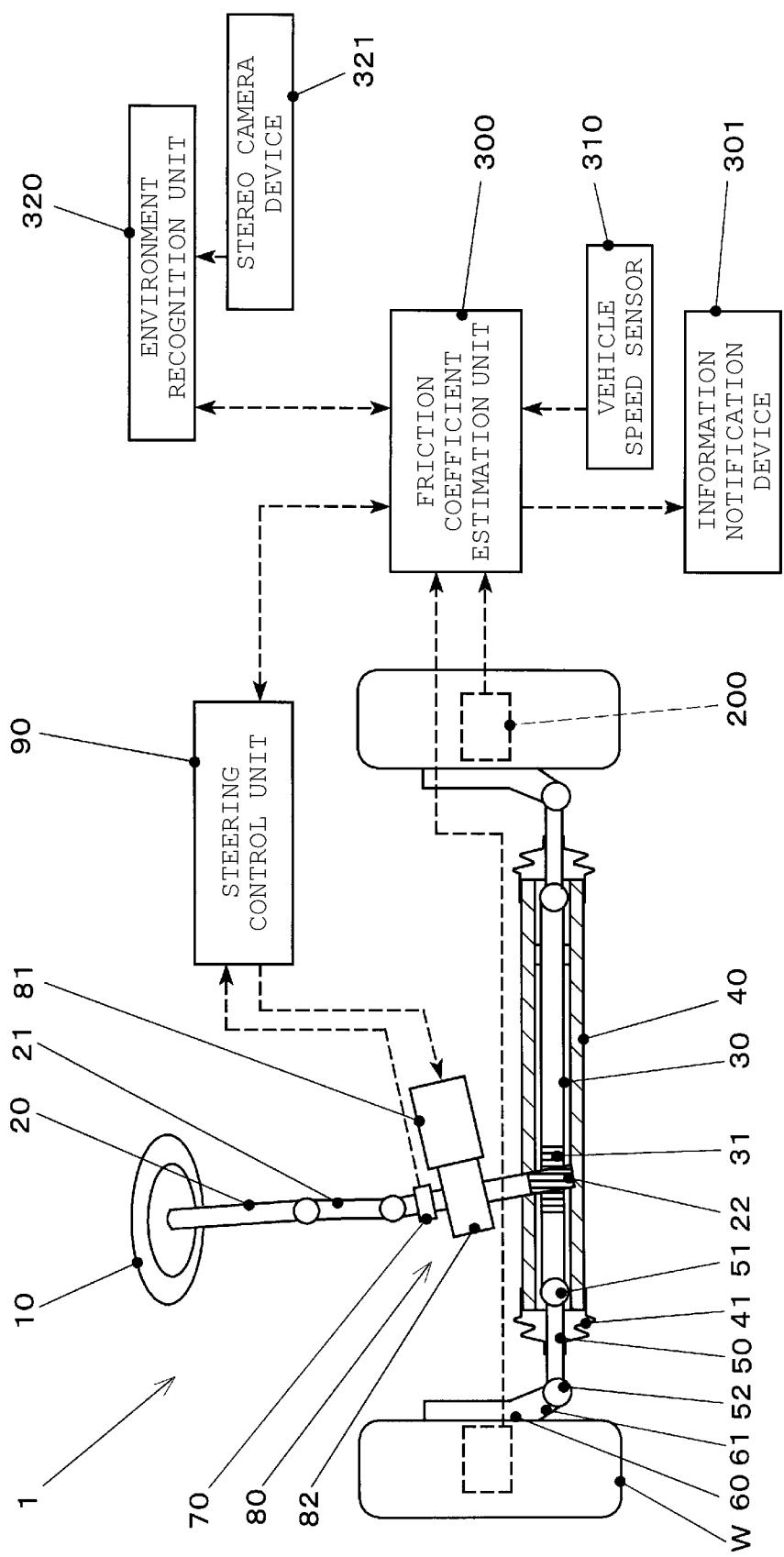

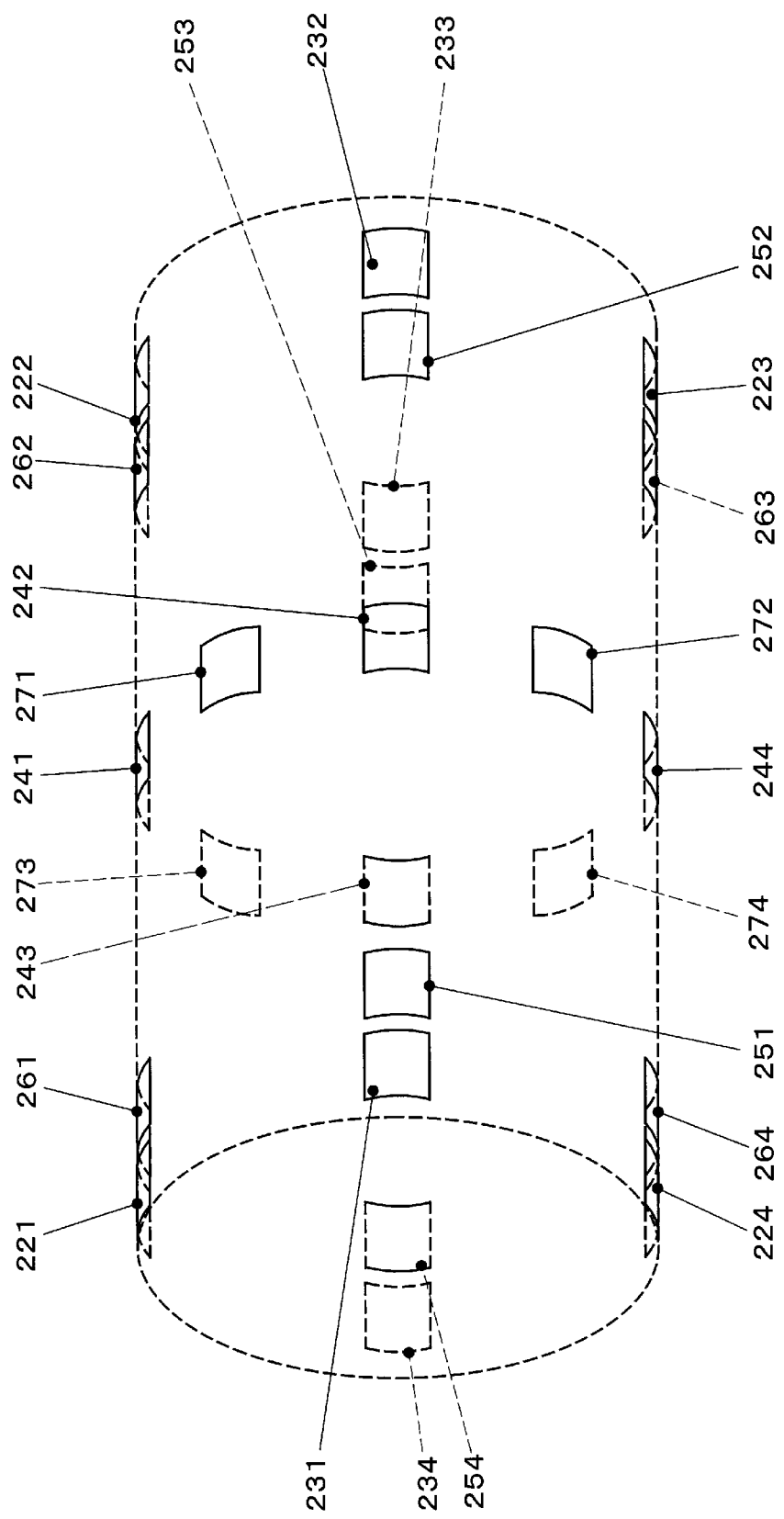

ESTIMATION DEVICE FOR ESTIMATING FRICTION COEFFICIENT OF ROAD SURFACE AND STEERING DEVICE

CROSS-REFERENCE TO RELATED APPLICATIONS

The present application claims priority from Japanese Patent Application No. 2020-068210 filed on Apr. 6, 2020, the entire contents of which are hereby incorporated by reference.

BACKGROUND

The disclosure relates to an estimation device for estimating a friction coefficient of a road surface on which a vehicle travels, and a steering device for steering a vehicle.

Vehicles such as automobiles may estimate a friction coefficient of a road surface for the purpose of using the estimated friction coefficient to provide a warning to a user such as a driver when a friction coefficient is low and to control a vehicle.

In the related art, when a tire slips due to either one of (i) steering and (ii) a driving/braking force, the friction coefficient can be estimated based on a degree of slip.

Further, for example, it has been proposed to estimate a friction coefficient of a road surface by performing a fast Fourier transform analysis for information output from an acceleration sensor of a vehicle body even when the vehicle is traveling straight at a constant speed where slip is unlikely to occur.

For example, as a technique of the related art for estimating a friction coefficient of a road surface, Japanese Unexamined Patent Application Publication (JP-A) No. 6-135214 describes determining the friction coefficient of the road surface by detecting a vertical acceleration acting on a spring of a suspension and calculating a power spectral density in a frequency domain.

Further, JP-A No. 2002-039744 describes detecting a front-rear force, a lateral force, a vertical force, and the like acting on a ground contact surface, based on a six component forces acting on a tire, and maintaining a frictional force near a peak value during an anti-lock control and a traction control.

SUMMARY

An aspect of the disclosure provides an estimation device for estimating a friction coefficient of a road surface. The device includes a sensor, a moment calculator, and a friction coefficient estimator. The sensor is configured to detect a force acting on a wheel. The moment calculator is configured to calculate a moment around a vertical axis at a center of a ground contact load of a tire of the wheel on a basis of an output of the sensor. The friction coefficient estimator is configured to estimate the friction coefficient of the road surface with which the tire is in contact, on a basis of the moment.

An aspect of the disclosure provides a steering device. The steering device includes an actuator, a steering controller, and the above-mentioned estimation device. The actuator is configured to steer a steering wheel of a vehicle. The steering controller is configured to control a generation force of the actuator. The steering controller changes control of the actuator according to an estimation result of a friction coefficient by the estimation device.

An aspect of the disclosure provides an estimation device for estimating a friction coefficient of a road surface. The device includes a sensor and circuitry. The sensor is configured to detect a force acting on a wheel. The circuitry is configured to calculate a moment around a vertical axis at a center of a ground contact load of a tire of the wheel on a basis of an output of the sensor. The circuitry is configured to estimate the friction coefficient of the road surface with which the tire is in contact, on a basis of the moment.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIG. 1 is a diagram schematically illustrating configurations of an estimation device for estimating a friction coefficient of a road surface and a steering device to which an embodiment of the disclosure is applied.

FIG. 4 is a schematic perspective view illustrating an arrangement of strain gauges in the six-component force detecting device of the embodiment.

DETAILED DESCRIPTION

Figure 2B:
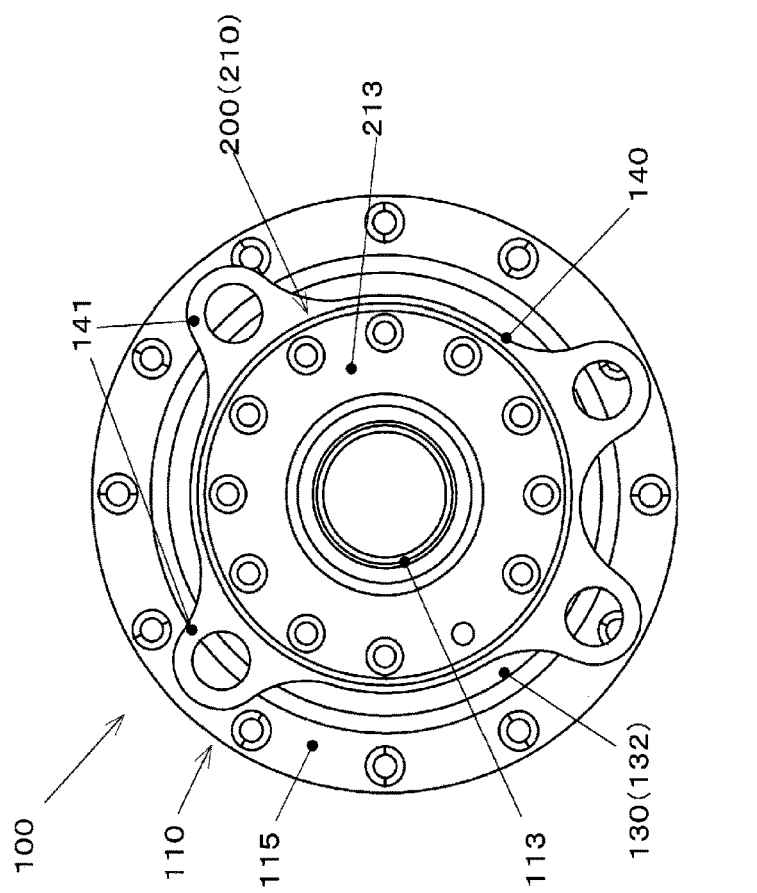
FIGS. 2A and 2B are views illustrating a hub unit according to the embodiment.

The technique described in JP-A No. 6-135214 estimates the friction coefficient based on an acceleration on an upper side of the spring of the vehicle, and further, uses a fast Fourier transform process. Therefore, when this technique detects a change in the friction coefficient of the road surface, a time response delay is large. In addition, the device has a complicated configuration in order to perform the fast Fourier transform.

The technique described in JP-A No. 2002-039744 performs control such that a tire generation force approaches a peak value of a frictional force when a tire force is near a limit, such as during anti-lock control and during traction control. This technique does not consider monitoring a friction coefficient of a road surface during normal traveling in which the tire force is relatively small.

It is desirable to provide an estimation device and a steering device capable of appropriately estimating a friction coefficient of a road surface even during normal traveling in which a time response delay is small and a tire force is small.

Hereinafter, an estimation device for estimating a friction coefficient of a road surface and a steering device to which an embodiment of the disclosure is applied will be described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

For example, the estimation device and the steering device of the embodiment are provided in an automobile such as a passenger vehicle and steer front wheels which are steering wheels.

The steering device of the embodiment includes a pinion-assisted electric power steering (EPS) device.

FIG. 1 is a diagram schematically illustrating configurations of the estimation device and the steering device of the embodiment.

A steering device 1 includes a steering wheel 10, a steering shaft 20, a rack shaft 30, a rack housing 40, a tie rod 50, a housing 60, a torque sensor 70, an actuator unit 80, a steering control unit 90, and the like.

The steering wheel 10 is an annular operating member which receives a steering operation in response to a driver rotating the annular operating member.

The steering wheel 10 is disposed in a vehicle cabin of the vehicle so as to face a driver's seat.

The steering shaft 20 is a rotation shaft having one end attached to the steering wheel 10. The steering shaft 20 transmits a rotation operation of the steering wheel 10 to a rack and pinion mechanism which converts the rotation operation into a translational motion.

A universal joint 21 capable of transmitting the rotation in a state where the steering shaft 20 is bent is provided in an intermediate portion of the steering shaft 20.

A pinion gear 22 is provided at an end of the steering shaft 20 on a side opposite to the steering wheel 10. The pinion gear 22 constitutes part of the rack and pinion mechanism.

The rack shaft 30 is a columnar member disposed so that a longitudinal direction (axial direction) thereof extends along a vehicle width direction.

The rack shaft 30 is supported so as to be translatable with respect to a vehicle body in the vehicle width direction.

A rack gear 31 is provided on a portion of the rack shaft 30. The rack gear 31 meshes with the pinion gear 22.

The rack gear 31 is driven by the pinion gear 22 according to the rotation of the steering shaft 20, and thus, the rack shaft 30 translates (moves straight) along the vehicle width direction.

The rack gear 31 is disposed offset to either one of right and left sides (commonly, driver's seat side) in the vehicle width direction.

For example, when a vehicle is a so-called right-hand drive vehicle having a right front seat as a driver's seat, the rack gear 31 is disposed offset to a right side from a center in a neutral state.

The rack housing 40 is a substantially cylindrical member which accommodates the rack shaft 30 while supporting the rack shaft 30 so that the rack shaft 30 is relatively displaceable along the vehicle width direction.

Rack boots 41 are provided at both ends of the rack housing 40.

The rack boot 41 is a member which prevents foreign matters such as dust from entering the rack housing 40 while allowing the tie rod 50 to relatively displace with respect to the rack housing 40.

For example, the rack boot 41 is formed of a resin-based material such as an elastomer and in a flexible bellows tube shape.

The tie rod 50 is a shaft-shaped interlocking member which couples an end of the rack shaft 30 and a knuckle arm 61 of the housing 60 to each other and rotates the housing 60 around a kingpin axis in conjunction with a translational movement of the rack shaft 30.

An inner end of the tie rod 50 in the vehicle width direction is swingably coupled to the end of the rack shaft 30 via a ball joint 51.

An outer end of the tie rod 50 in the vehicle width direction is coupled to the knuckle arm 61 of the housing 60 via a ball joint 52.

A turnbuckle mechanism (not illustrated) for toe-in adjustment is provided at a coupling portion between the tie rod 50 and the ball joint 52.

The housing (knuckle) 60 is a member which accommodates a hub bearing which rotatably supports a wheel W around an axle.

The housing 60 has the knuckle arm 61 which projects forward or rearward with respect to the axle.

The housing 60 is supported so as to be rotatable around the kingpin axis which is a predetermined rotation center axis.

For example, when a front suspension of the vehicle is a MacPherson strut suspension, the kingpin axis is a virtual axis which couples a center of a bearing of a strut top mount to a center of the ball joint which couples a lower portion of the housing 60 and a transverse link (lower arm) to each other.

The housing 60 is pushed and pulled in the vehicle width direction by the rack shaft 30 via the tie rod 50, and thus, the housing 60 rotates around the kingpin axis to steer the wheels W.

The torque sensor 70 is a sensor which detects a torque acting on the steering shaft 20.

The torque sensor 70 is provided in an intermediate portion of the steering shaft 20.

An output of the torque sensor 70 is transmitted to the steering control unit 90.

The actuator unit 80 is a drive device which rotationally drives a region of the steering shaft 20 near the pinion gear 22 to perform power assist during manual driving or a steering operation during self-driving.

The actuator unit 80 includes a motor 81, a gear box 82, and the like.

The motor 81 is an electric actuator which generates a driving force applied to the steering shaft 20.

A rotation direction and an output torque of the motor 81 are controlled by the steering control unit 90.

The gear box 82 includes a reduction gear train which decelerates a rotational output (amplifies torque) of the motor 81 and transmits the decelerated rotational output to the steering shaft 20.

The steering control unit 90 is a control device which provides command values of the rotation direction and output torque to the motor 81.

The steering control unit 90 sets command values to be applied to the motor 81 based on a torque input direction and a detected torque value of the torque sensor 70 during the manual driving of the vehicle.

During the self-driving or during a driving assistance control (for example, lane keep assist) of the vehicle, the steering control unit 90 sets the command values to be applied to the motor 81 based on a command provided from an self-driving control device (not illustrated).

In the embodiment, the wheel W is supported by a hub unit described below.

Figure 2A:
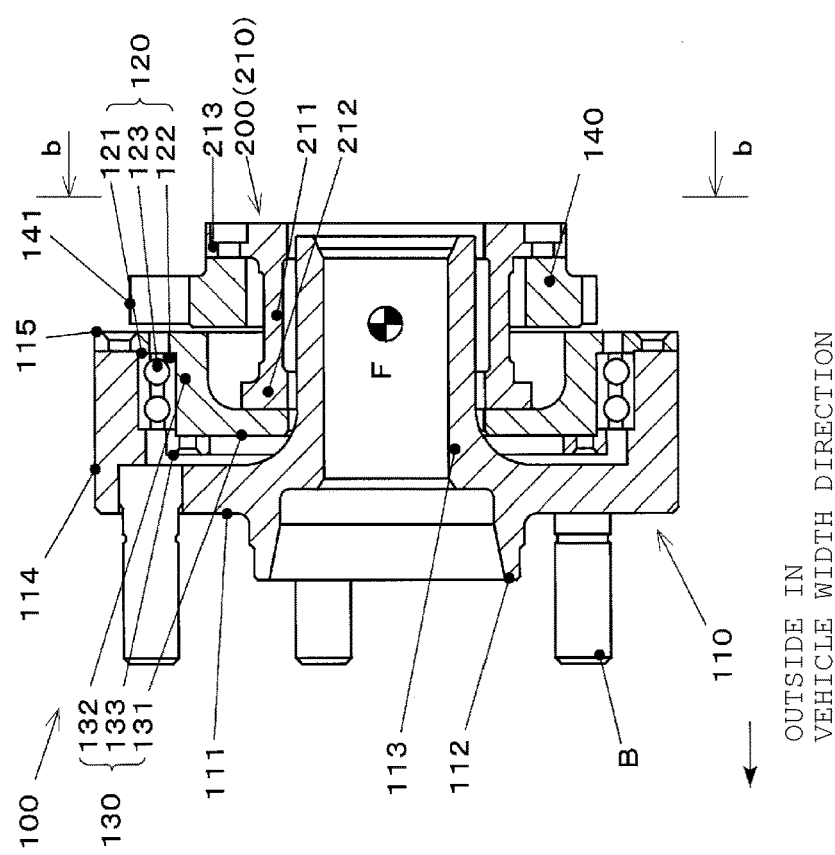

FIGS. 2A and 2B are views illustrating the hub unit according to the embodiment. FIG. 2A is a cross-sectional view of the hub unit taken along a vertical plane passing through the axle (rotation center axis of the wheel). FIG. 2B is a view illustrating the hub unit when viewed from b-b of FIG. 2A.

As illustrated in FIGS. 2A and 2B, a hub unit 100 includes a hub 110, a bearing 120, a sensing member 130, a mount 140, a six-component force detecting device 200, and the like.

The hub 110 is a member to which a rim center of the wheel (not illustrated) is fixed and which rotates around an axle together with the wheel.

The hub 110 includes a disk 111, a center portion 112, a drive shaft mount 113, an outer cylinder 114, a bearing fixing ring 115, and the like.

The disk 111 is substantially concentric with the axle, and is formed in a substantially flat plate shape.

For example, in the disk 111, five hub bolts B used for fastening the wheel are arranged on a predetermined pitch circle at equal intervals.

The center portion 112 is a cylindrical portion projecting outward in the vehicle width direction from a center of the disk 111.

The center portion 112 is inserted into a recess (not illustrated) provided on a rim, and guides the wheel so that the wheel and the hub 110 can be mounted concentrically when the wheel is mounted.

The drive shaft mount 113 is a cylindrical portion projecting inward in the vehicle width direction from the center of the disk 11.

A spline hole which spline-engages with a spline shaft of a drive shaft (not illustrated) is formed on an inner diameter side of the drive shaft mount 113.

A main part of the drive shaft mount 113 is inserted into an inner diameter side of a sensitive body 210 of the six-component force detecting device 200.

The outer cylinder 114 is a cylindrical portion which projects inward in the vehicle width direction from an outer peripheral edge of the disk 111. The outer cylinder 114 is substantially concentric with the axle.

The outer cylinder 114 is a portion to which an outer ring 121 of the bearing 120 is fixed.

In order to hold the outer ring 121, a portion whose inner diameter increases in a stepwise manner from an inner end in the vehicle width direction to a width substantially the same as a width of the outer ring 121 is formed on an inner peripheral surface of the outer cylinder 114, and the outer ring 121 is fitted into the portion.

For example, the disk 111, the center portion 112, the drive shaft mount 113, and the outer cylinder 114 described above are permanently affixed to each other by machining a forged workpiece.

For example, the bearing fixing ring 115 is an annular portion which is fixed to the inner end of the outer cylinder 114 in the vehicle width direction by screwing.

The bearing fixing ring 115 has an outer diameter substantially equal to that of the outer cylinder 114 and an inner diameter smaller than an outer diameter of the outer ring 121 of the bearing 120. The bearing fixing ring 115 holds the inner end of the outer ring 121 assembled to the outer cylinder 114 in the vehicle width direction and prevents the outer ring 121 from falling off.

For example, the bearing 120 is a double-row deep groove ball bearing which rotatably supports the hub 110 around the axle. The bearing 120 has the outer ring 121 having a raceway surface formed on an inner diameter side thereof, an inner ring 122 having a raceway surface formed on an outer diameter side thereof, steel balls 123 which are rolling elements assembled between the outer ring 121 and the inner ring 122, and the like.

The sensing member 130 is a member which is disposed on an inner diameter side of the outer cylinder 114 of the hub 110 and to which the inner ring 122 of the bearing 120 is fixed.

The sensing member 130 has a disk 131, an outer cylinder 132, a bearing fixing ring 133, and the like.

The disk 131 is substantially concentric with the axle and substantially in a flat plate shape. A circular opening into which the drive shaft mount 113 of the hub 110 is inserted is formed in the center of the disk 131.

A first flange 212 of the sensitive body 210 of the six-component force detecting device 200, which will be described later, is fastened to an inner peripheral edge of the disk 131.

The outer cylinder 132 is a cylindrical portion which projects inward in the vehicle width direction from the outer peripheral edge of the disk 131. The outer cylinder 132 is substantially concentric with the axle.

The outer cylinder 132 is a portion to which the inner ring 122 of the bearing 120 is fixed.

In order to hold the inner ring 122, a portion whose outer diameter decreases in a stepwise manner from an outer end in the vehicle width direction to a width substantially the same as the width of the inner ring 122 is formed on an outer peripheral surface of the outer cylinder 132. This portion is inserted into an inner diameter side of the inner ring 122.

For example, the disk 131 and the outer cylinder 132 described above are permanently affixed to each other by machining a forged workpiece.

For example, the bearing fixing ring 133 is an annular portion which is fixed to an outer end of the outer cylinder 132 in the vehicle width direction by screwing.

The bearing fixing ring 133 has an outer diameter larger than the inner diameter of the inner ring 122. The bearing fixing ring 133 holds an outer end of the inner ring 122 assembled to the outer cylinder 132 in the vehicle width direction to prevent the inner ring 122 from falling off.

The mount 140 is a plate-shaped member fixed to the housing 60.

For example, four mounting tabs 141 are provided on the outer peripheral edge of the mount 140. The mounting tabs 141 project toward the outer diameter side, and have bolt holes for fastening the fixing bolts to the housing 60.

A circular opening into which the sensitive body 210 of the six-component force detecting device 200 is inserted is formed at the center of the mount 140. A second flange 213 of the sensitive body 210 is fastened to an inner peripheral edge of the circular opening.

The six-component force detecting device 200 is formed in a substantially cylindrical shape. The six-component force detecting device 200 includes the sensitive body 210 which couples the sensing member 130 and the mount 140, plural strain gauges which are provided in the sensitive body 210, and a bridge circuit including the strain gauges.

Figure 3:
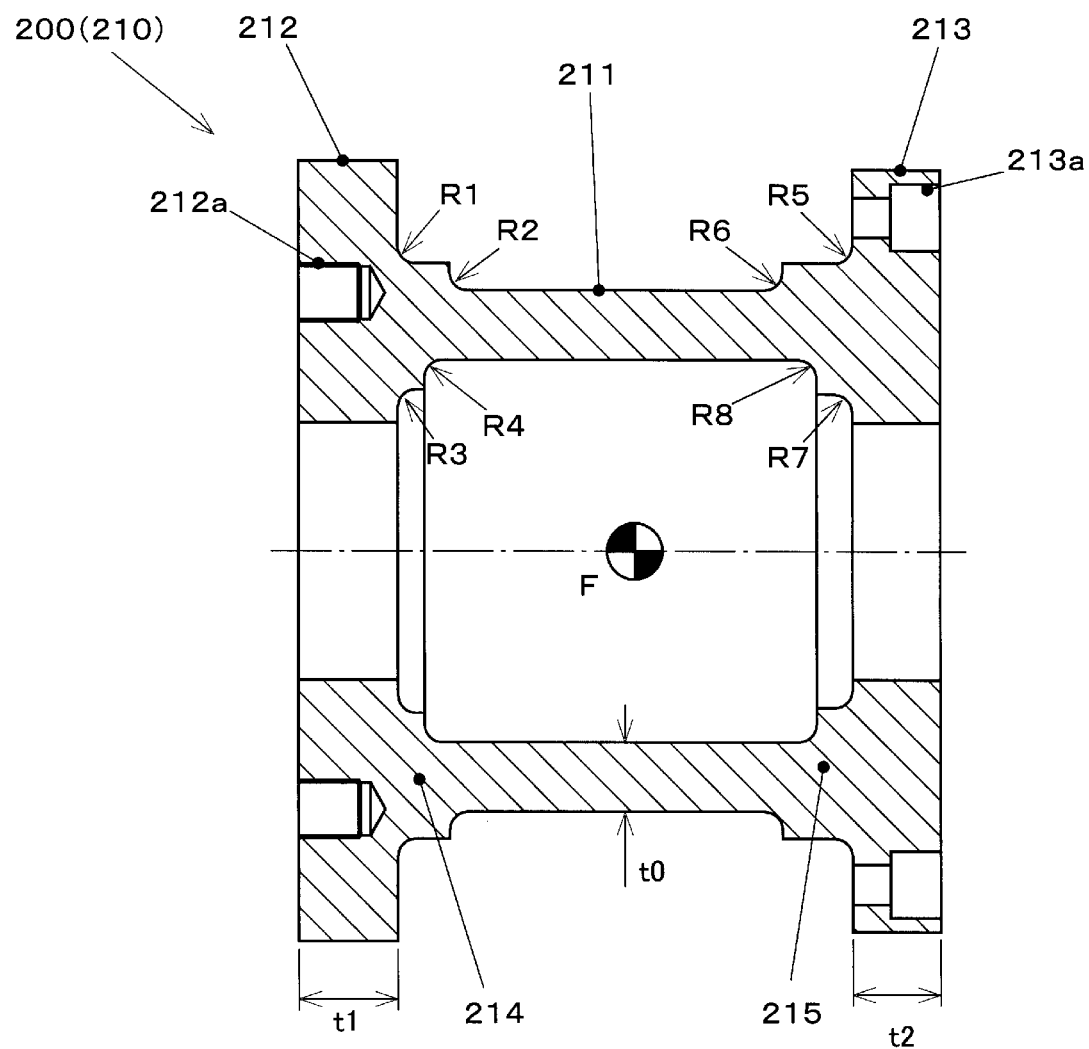
FIG. 3 is a cross-sectional of a sensitive body in a six-component force detecting device of the embodiment taken along a plane including a central axis.

FIG. 3 is a cross-sectional view of the sensitive body 210 in the six-component force detecting device 200 of the embodiment taken along a plane including the central axis.

As illustrated in FIG. 3, the sensitive body 210 includes a cylinder portion 211, a first flange 212, the second flange 213, and the like.

The cylinder portion 211 is a portion formed in a cylindrical shape having an inner diameter and outer diameter which are substantially constant over a predetermined axial length, and to which the plural strain gauges, which will be described later, are attached (bonded). The cylinder portion 211 is disposed substantially concentric with the axle.

The first flange 212 is a flat plate-shaped portion which is provided at one end of the cylinder portion 211 and which projects from the cylinder portion 211 to the outer diameter side and the inner diameter side.

The inner peripheral edge of the disk 131 of the sensing member 130 is fixed o the first flange 212. The first flange 212 has screw holes 212a to which bolts (not illustrated) are fastened.

An intermediate portion 214 is provided between the cylinder portion 211 and the first flange 212 so that an outer diameter and an inner diameter are intermediate therebetween. An outer peripheral surface of the intermediate portion 214 is stepped from an outer peripheral surface of the cylinder portion 211 so that an outer diameter of the intermediate portion 214 is larger than that of the cylinder portion 211. An inner peripheral surface of the intermediate portion 214 is stepped from the inner peripheral surface of the cylinder portion 211 so that an inner diameter of the intermediate portion 214 is smaller than that of the cylinder portion 211.

An R portion R1 is provided between an end surface on the outer diameter side of the first flange 212 on the second flange 213 side and the outer peripheral surface of the intermediate portion 214.

An R portion R2 is provided between the end surface on the outer diameter side of the intermediate portion 214 on the second flange 213 side and the outer peripheral surface of the cylinder portion 211.

An R portion R3 is provided between the end surface on the inner diameter side of the first flange 212 on the second flange 213 side and the inner peripheral surface of the intermediate portion 214.

An R portion R4 is provided between the end surface on the inner diameter side of the intermediate portion 214 on the second flange 213 side and the inner peripheral surface of the cylinder portion 211.

Of the R portions R1 to R4, positions of the R portions R1 and R3 in the axial direction of the sensitive body 210 are substantially the same.

The R portions R2 and R4 are disposed so that a position of the R portion R2 in the axial direction of the sensitive body 210 is offset to be closer to the second flange 213 side.

The second flange 213 is a flat plate-shaped portion which is provided at an opposite end of the cylinder portion 211 to the first flange 212 and which projects to the outer diameter side and the inner diameter side from the cylinder portion 211.

The inner peripheral edge of the mount 140 is fixed to the second flange 213. The second flange 213 has bolt holes 213a into which bolts (not illustrated) are inserted.

As illustrated in FIGS. 2A and 2B, the inner peripheral edge of the mount 140 abuts against a surface of the second flange 213 on the first flange 212 side, and is fastened by the bolts inserted into the bolt holes 213a of the second flange 213 from the inside in the vehicle width direction.

An intermediate portion 215 is provided between the cylinder portion 211 and the second flange 213 so that an outer diameter and an inner diameter are intermediate therebetween. An outer peripheral surface of the intermediate portion 215 is stepped from the outer peripheral surface of the cylinder portion 211 so that an outer diameter of the intermediate portion 215 is larger than that of the cylinder portion 211. An inner peripheral surface of the intermediate portion 215 is stepped from the inner peripheral surface of the cylinder portion 211 so that an inner diameter of the intermediate portion 215 is smaller than that of the cylinder portion 211.

An R portion R5 is provided between the end surface on the outer diameter side of the second flange 213 on the first flange 212 side and the outer peripheral surface of the intermediate portion 215.

An R portion R6 is provided between the end surface on the outer diameter side of the intermediate portion 215 on the first flange 212 side and the outer peripheral surface of the cylinder portion 211.

An R portion R7 is provided between the end surface on the inner diameter side of the second flange 213 on the first flange 212 side and the inner peripheral surface of the intermediate portion 215.

An R portion R8 is provided between the end surface on the inner diameter side of the intermediate portion 215 on the first flange 212 side and the inner peripheral surface of the cylinder portion 211.

Of the R portions R5 to R8, positions of the R portions R5 and R7 in the axial direction of the sensitive body 210 are substantially the same.

The R portions R6 and R8 are disposed so that in a position of the R portion R6 in the axial direction of the sensitive body 210 is offset to be closer to the first flange 212 side.

A thickness t1 of the first flange 212 and a thickness t2 of the second flange 213 are sufficiently larger than a wall thickness t0 of the cylinder portion 211.

The six-component force detecting device 200 includes an Fx detection system, an Fy detection system, an Fz detection system, an Mx detection system, an My detection system, and an Mz detection system, each of which includes the bridge circuit including the strain gauges provided in the cylinder portion 211 of the sensitive body 210 described above.

The Fx detection system detects a force Fx, in a radial direction (hereinafter, referred to as an x axis direction), acting on the cylinder portion 211 of the sensitive body 210.

The Fy detection system detects a force Fy, in a radial direction (hereinafter, referred to as a y axis direction) that is a direction orthogonal to the x axis direction, acting on the cylinder portion 211 of the sensitive body 210.

The Fz detection system detects a force Fz, in an axial direction (hereinafter referred to as a z axis direction), acting on the cylinder portion 211 of the sensitive body 210.

The Mx detection system detects a moment Mx, around an x axis, acting on the cylinder portion 211 of the sensitive body 210.

The My detection system detects a moment My, around a y axis, acting on the cylinder portion 211 of the sensitive body 210.

The Mz detection system detects a moment Mz, around a z-axis, acting on the cylinder portion 211 of the sensitive body 210.

The Fx detection system, the Fy detection system, the Fz detection system, the Mx detection system, the My detection system, and the Mz detection system described above each has the bridge circuit including the four strain gauges.

FIG. 4 is a schematic perspective view illustrating an arrangement of the strain gauges in the six-component force detecting device of the embodiment.

Figure 5A:
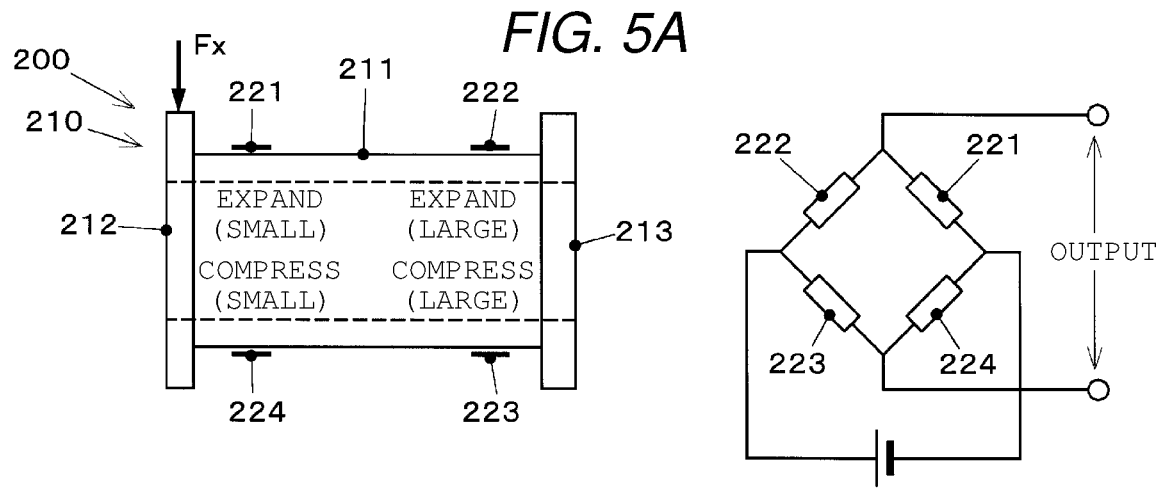
FIGS. 5A to 5C are diagrams illustrating the arrangement of the strain gauges of a force detection system and a configuration of a bridge circuit in the six-component force detecting device of the embodiment.
Figure 5B:
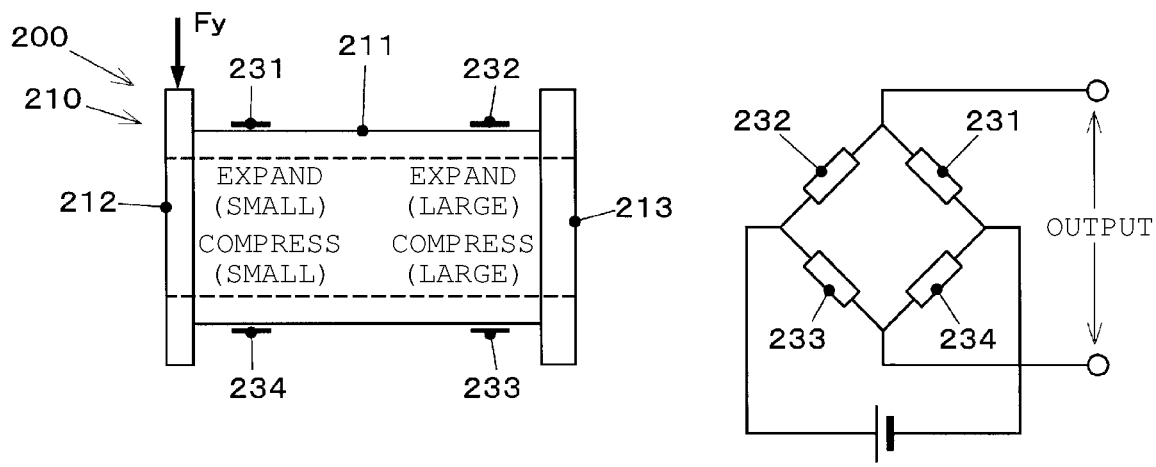
Figure 5C:
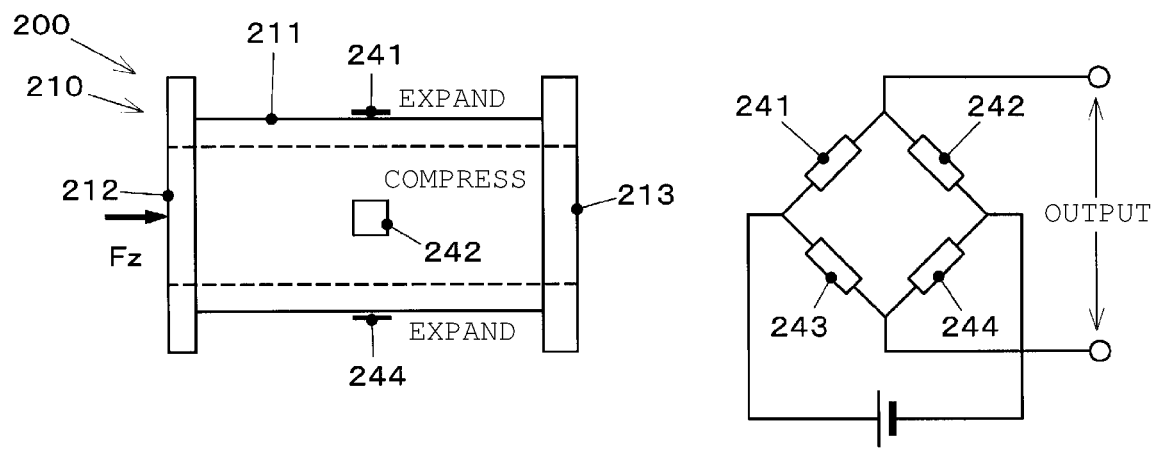

FIGS. 5A to 5C are diagrams illustrating the arrangements of the strain gauges of the force detection systems and configurations of the bridge circuits in the six-component force detecting device of the embodiment. FIGS. 5A, 5B, and 5C illustrate the Fx detection system, the Fy detection system, and the Fz detection system, respectively.

Figure 6A:
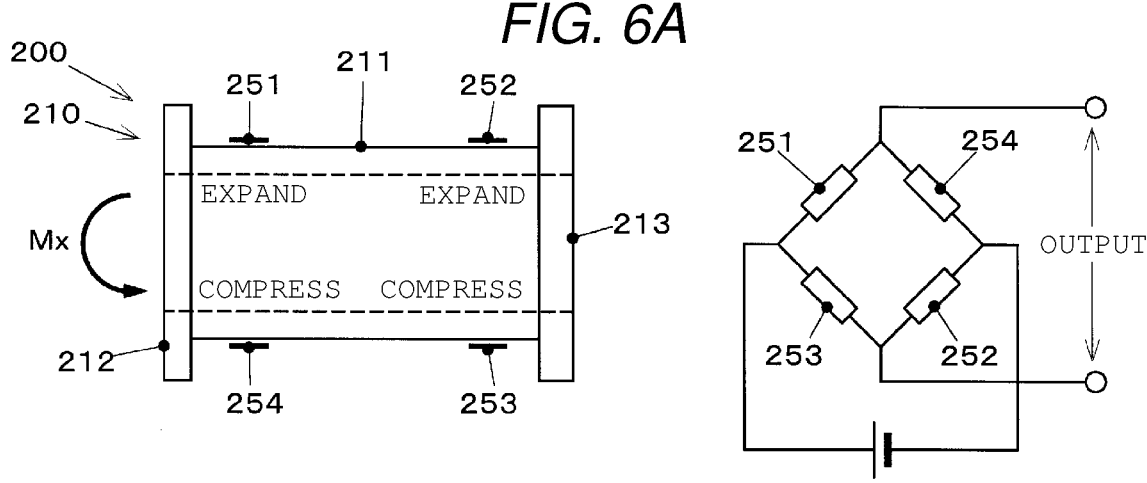
FIGS. 6A to 6C are diagrams illustrating a configuration of a bridge circuit of a moment detection system in the six-component force detecting device of the embodiment.
Figure 6B:
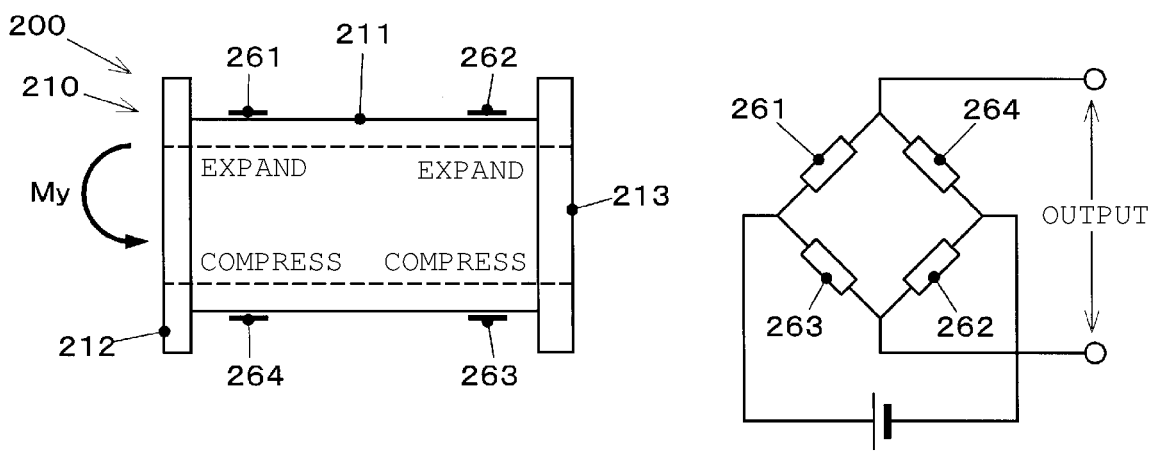
Figure 6C:
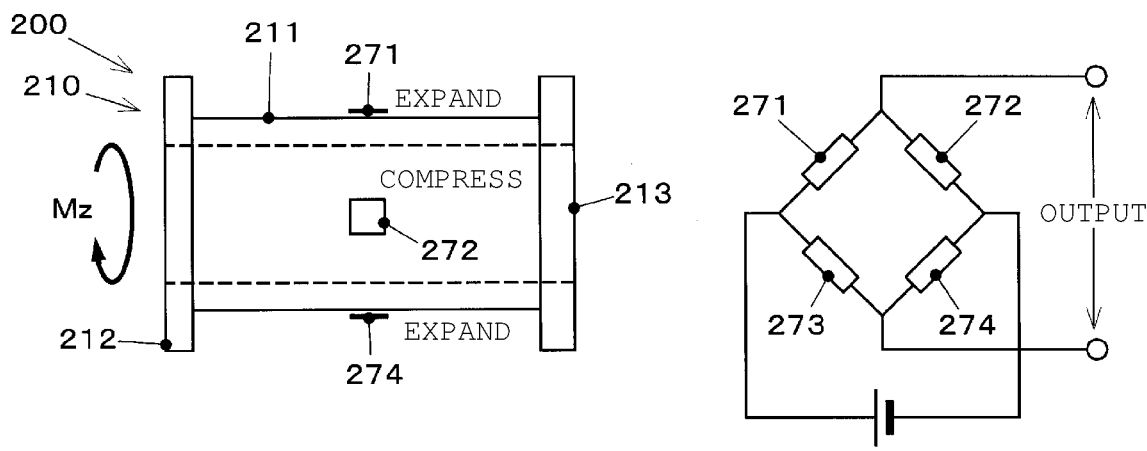

FIGS. 6A to 6C are diagram illustrating configurations of the bridge circuits of the moment detection systems in the six-component force detecting device of the embodiment. FIGS. 6A, 6B, and 6C illustrate the Mx detection system, the My detection system, and the Mz detection system, respectively.

In FIGS. 5A to 6C, the intermediate portions 214, 215 and the like are not illustrated.

As illustrated in FIGS. 4 and 5A, the Fx detection system includes strain gauges 221 to 224. Each of the strain gauges 221 to 224 is a uniaxial strain gauge, and is attached to the outer peripheral surface of the cylinder portion 211 so that a detection direction thereof is parallel to a central axis direction of the cylinder portion 211.

The strain gauge 221 is disposed in a region on the first flange 212 side (that is, a region near the intermediate portion 214) on the outer peripheral surface of the cylinder portion 211.

The strain gauge 222 is disposed on a straight line which passes through the strain gauge 221 and which is parallel to the axial direction of the cylinder portion 211. The strain gauge 222 is disposed in a region on the second flange 213 side (that is, a region near the intermediate portion 215) on the outer peripheral surface of the cylinder portion 211.

The strain gauge 223 is disposed at a position which is obtained by shifting a position of the strain gauge 222 by 180° around the central axis of the cylinder portion 211 (that is, the positions of the strain gauges 222, 223 are symmetrical about the central axis of the cylinder portion 211).

The strain gauge 224 is disposed at a position obtained by shifting a position of the strain gauge 221 by 180° around the central axis of the cylinder portion 211 (that is, the positions of the strain gauges 221, 224 are symmetrical about the central axis of the cylinder portion 211).

As illustrated in FIG. 5A, in the bridge circuit of the Fx detection system, the strain gauges 221 to 224 are sequentially coupled to each other in a loop, a positive electrode and a negative electrode of a power supply are respectively coupled to between the strain gauge 222 and the strain gauge 223, and between the strain gauge 221 and the strain gauge 224, and a potential difference between (i) a portion between the strain gauge 221 and the strain gauge 222 and (ii) a portion between the strain gauge 223 and the strain gauge 224 is extracted as an output.

The Fy detection system includes strain gauges 231 to 234. Each of the strain gauges 231 to 234 is a uniaxial strain gauge, and is attached to the outer peripheral surface of the cylinder portion 211 so that a detection direction thereof is parallel to the central axis direction of the cylinder portion 211.

The strain gauge 231 is disposed at a position obtained by shifting the position of the strain gauge 221 of the Fx detection system by 90° around the central axis of the cylinder portion 211.

The strain gauge 232 is disposed at a position obtained by shifting the position of the strain gauge 222 of the Fx detection system by 90° around the central axis of the cylinder portion 211.

The strain gauge 231 and the strain gauge 232 are disposed on the same straight line parallel to the axial direction of the cylinder portion 211.

The strain gauge 233 is disposed at a position obtained by shifting the position of the strain gauge 232 by 180° around the central axis of the cylinder portion 211 (that is, the positions of the strain gauges 232, 233 are symmetrical about the central axis of the cylinder portion 211).

The strain gauge 234 is disposed at a position obtained by shifting the position of the strain gauge 231 by 180° around the central axis of the cylinder portion 211 (that is, the positions of the strain gauges 231, 234 are symmetrical about the central axis of the cylinder portion 211).

As illustrated in FIG. 5B, in the bridge circuit of the Fy detection system, the strain gauges 231 to 234 are sequentially coupled to each other in a loop, the positive electrode and the negative electrode of the power supply are respectively coupled to between the strain gauge 232 and the strain gauge 233, and between the strain gauge 231 and the strain gauge 234, and a potential difference between (i) a portion between the strain gauge 231 and the strain gauge 232 and (ii) a portion between the strain gauge 233 and the strain gauge 234 is extracted as an output.

The Fz detection system includes strain gauges 241 to 244. Each of the strain gauges 241 to 244 is a uniaxial strain gauge, and is attached to the outer peripheral surface of the cylinder portion 211 so that a detection direction thereof is parallel to the central axis direction of the cylinder portion 211.

The strain gauge 241 is disposed between the strain gauges 221 and 222 of the Fx detection system.

The strain gauges 242, 243, and 244 are disposed at positions where phases thereof around the central axis of the cylinder portion 211 are shifted by 90°, 180°, and 270° with respect to the strain gauges 241.

Further, as illustrated in FIG. 5C, in the bridge circuit of the Fz detection system, the strain gauges 241, 242, 244, and 243 are sequentially coupled to each other in a loop, the positive electrode and the negative electrode of the power supply are respectively coupled to between the strain gauge 241 and the strain gauge 243, and between the strain gauge 242 and the strain gauge 244, and a potential difference between (i) a portion between the strain gauge 241 and the strain gauge 242 and (ii) a portion between the strain gauge 243 and the strain gauge 244 is extracted as an output.

As illustrated in FIGS. 4 and 6A, the Mx detection system includes strain gauges 251 to 254. Each of the strain gauges 251 to 254 is uniaxial strain gauges, and is attached to the outer peripheral surface of the cylinder portion 211 so that a detection direction thereof is parallel to the central axis direction of the cylinder portion 211.

The strain gauge 251 is disposed adjacent to the strain gauge 231 of the Fy detection system in the central axis direction of the cylinder portion 211.

The strain gauge 252 is disposed adjacent to the strain gauge 232 of the Fy detection system in the central axis direction of the cylinder portion 211.

The strain gauge 251 and the strain gauge 252 are disposed on the same straight line parallel to the axial direction of the cylinder portion 211.

The strain gauge 253 is disposed at a position obtained by shifting the strain gauge 252 by 180° around the central axis of the cylinder portion 211 (that is, the positions of the strain gauges 252, 253 are symmetrical about the central axis of the cylinder portion 211).

The strain gauge 254 is disposed at a position obtained by shifting the position of the strain gauge 251 by 180° around the central axis of the cylinder portion 211 (that is, the positions of the strain gauges 251, 254 are symmetrical about the central axis of the cylinder portion 211).

As illustrated in FIG. 6A, in the bridge circuit of the Mx detection system, the strain gauges 251, 253, 252, and 254 are sequentially coupled to each other in a loop, the positive electrode and the negative electrode of the power supply are respectively coupled to between the strain gauge 251 and the strain gauge 253, and between the strain gauge 252 and the strain gauge 254, and a potential difference between (i) a portion between the strain gauge 251 and the strain gauge 254 and (ii) a portion between the strain gauge 253 and the strain gauge 252 is extracted as an output.

The My detection system includes strain gauges 261 to 264. Each of the strain gauges 261 to 264 is a uniaxial strain gauge, and is attached to the outer peripheral surface of the cylinder portion 211 so that a detection direction thereof is parallel to the central axis direction of the cylinder portion 211.

The strain gauge 261 is disposed adjacent to the strain gauge 221 of the Fx detection system in the central axis direction of the cylinder portion 211.

The strain gauge 262 is disposed adjacent to the strain gauge 222 of the Fx detection system in the central axis direction of the cylinder portion 211.

The strain gauge 261 and the strain gauge 262 are disposed on the same straight line parallel to the axial direction of the cylinder portion 211.

The strain gauge 263 is disposed at a position obtained by shifting the position of the strain gauge 262 by 180° around the central axis of the cylinder portion 211 (that is, the positions of the strain gauges 262, 263 are symmetrical about the central axis of the cylinder portion 211).

The strain gauge 264 is disposed at a position obtained by shifting the position of the strain gauge 261 by 180° around the central axis of the cylinder portion 211 (that is, the positions of the strain gauges 261, 264 are symmetrical about the central axis of the cylinder portion 211).

As illustrated in FIG. 6B, in the bridge circuit of the My detection system, the strain gauges 261, 263, 262, and 264 are sequentially coupled to each other in a loop, the positive electrode and the negative electrode of the power supply are respectively coupled to between the strain gauge 261 and the strain gauge 263, and between the strain gauge 262 and the strain gauge 264, and a potential difference between (i) a portion between the strain gauge 261 and the strain gauge 264 and (ii) a portion between the strain gauge 263 and the strain gauge 262 is extracted as an output.

The Mz detection system includes strain gauges 271 to 274. Each of the strain gauges 271 to 274 is a shear strain gauge, and is attached to the outer peripheral surface of the cylinder portion 211 so that a detection direction thereof is a circumferential direction of the cylinder portion 211.

The strain gauge 271 is disposed between the strain gauges 241 and 242 of the Fz detection system.

The strain gauge 272 is disposed between the strain gauges 242 and 244 of the Fz detection system.

The strain gauges 272, 273 are symmetrical about the central axis of the cylinder portion 211. The positions of the strain gauges 271, 274 are symmetrical about the central axis of the cylinder portion 211.

As illustrated in FIG. 6C, in the bridge circuit of the Mz detection system, the strain gauges 271, 273, 274, and 272 are sequentially coupled to each other in a loop, the positive electrode and the negative electrode of the power supply are respectively coupled to between the strain gauge 271 and the strain gauge 273, and between the strain gauge 272 and the strain gauge 274, and a potential difference between (i) a portion between the strain gauge 271 and the strain gauge 272 and (ii) a portion between the strain gauge 273 and the strain gauge 274 is extracted as an output.

The strain gauges of each detection system described above are disposed so that a focal point F of the detection system substantially coincides with a center of the wheel (not illustrated) (that is, a center of a tire width on the axle).

In the embodiment, a friction coefficient estimation unit 300 is provided. The friction coefficient estimation unit 300 estimates a friction coefficient of a road surface based on an output of the six-component force detecting device 200.

For example, even when a vehicle is traveling straight on a flat road surface at a constant speed, a moment $Mt_Z$ around a vertical axis at a center of a ground contact load of a tire of a wheel FW (tire-ground contact load) acts on the wheel FW due to various acting forces.

For example, the moment $Mt_Z$ is generated by influences of a camber angle with respect to the ground, a conicity torque, ply steer, and the like.

The camber angle with respect to the ground refers to an inclination angle of the rotation center axis of the wheel FW with respect to the road surface.

When the camber angle with respect to the ground is present, the wheel FW generates a lateral force (camber thrust), which affects the moment $Mt_Z$.

The conicity refers to a tapered change in a diameter on a tread surface of the tire of the wheel FW.

Even when the conicity is present, a lateral force is generated as in the case where the camber angle with respect to the ground is present, which affects the moment $Mt_Z$ (conicity torque).

The ply steer refers to a minute lateral force generated even when the camber angle of the wheel FW with respect to the ground and a slip angle of the wheel FW are zero. In a case of a radial tire, the ply steer is mainly generated in a direction (inclination direction of a belt cord) in which the outermost layer tread belt is attached.

It is said that the ply steer is dominated by effects of deformation of the tread surface of the tire according to a movement of an outermost layer belt. The ply steer generates the moment $Mt_Z$ in the same direction on right and left wheels.

The friction coefficient estimation unit 300 estimates the friction coefficient of the road surface based on the change in the moment $Mt_Z$ due to these effects.

The friction coefficient estimation unit 300 is configured to receive the output of the six-component force detecting devices 200 provided in the right and left front wheels and communicate with the steering control unit 90.

Function and operation of the friction coefficient estimation unit 300 will be described in detail later.

The friction coefficient estimation unit 300 includes an information notification device 301 that notifies a user (such as the driver) when the estimated friction coefficient is low.

Examples of the information notification device 301 include an image display device, an audio output device, and a warning light.

A vehicle speed sensor 310 that detects a traveling speed (vehicle speed) of a vehicle is coupled to the friction coefficient estimation unit 300.

An environment recognition unit 320 is communicably coupled to the friction coefficient estimation unit 300.

The environment recognition unit 320 recognizes information on an environment, such as a road shape around the host vehicle and various obstacles around the host vehicle, based on outputs of various sensors, road-to-vehicle communication, vehicle-to-vehicle communication, map data, and the like.

For example, a stereo camera device 321 is coupled to the environment recognition unit 320 as one of the sensors.

The stereo camera device 321 includes a pair of imaging devices (cameras), an image processor, and the like. The imaging devices are disposed apart from each other in the vehicle width direction with an imaging range located in front of the vehicle. The image processor performs stereo image processing on the images captured by the cameras.

The environment recognition unit 320 detects a lateral position in a lane of the host vehicle based on the output of the stereo camera device 321 and transmits the detected lateral position to the steering control unit 90.

The steering control unit 90 performs a lane keep assist control that controls the actuator unit 80 so that the lateral position in the lane is within a predetermined range near the lane center.

The environment recognition unit 320 determines a type of a road surface (for example, from among a dry paved road surface, a wet paved road surface, a snow-packed road, an ice-snow road, and the like) on which the vehicle is currently traveling based on the output of the stereo camera device 321.

The friction coefficient estimation unit 300 calculates (i) a position of a center of a tire-ground contact load and (ii) a moment $Mt_Z$ around the vertical axis passing through the center of the ground contact load, based on a six-component force F at a wheel center detected by the six-component force detecting device 200.

This moment $Mt_Z$ is a value that correlates with the friction coefficient of the road surface.

In one embodiment, the friction coefficient estimation unit 300 serves as a "moment calculator" and a "friction coefficient estimator".

Hereinafter, a method for calculating the position of the center of the ground contact load will be described.

Figure 7:
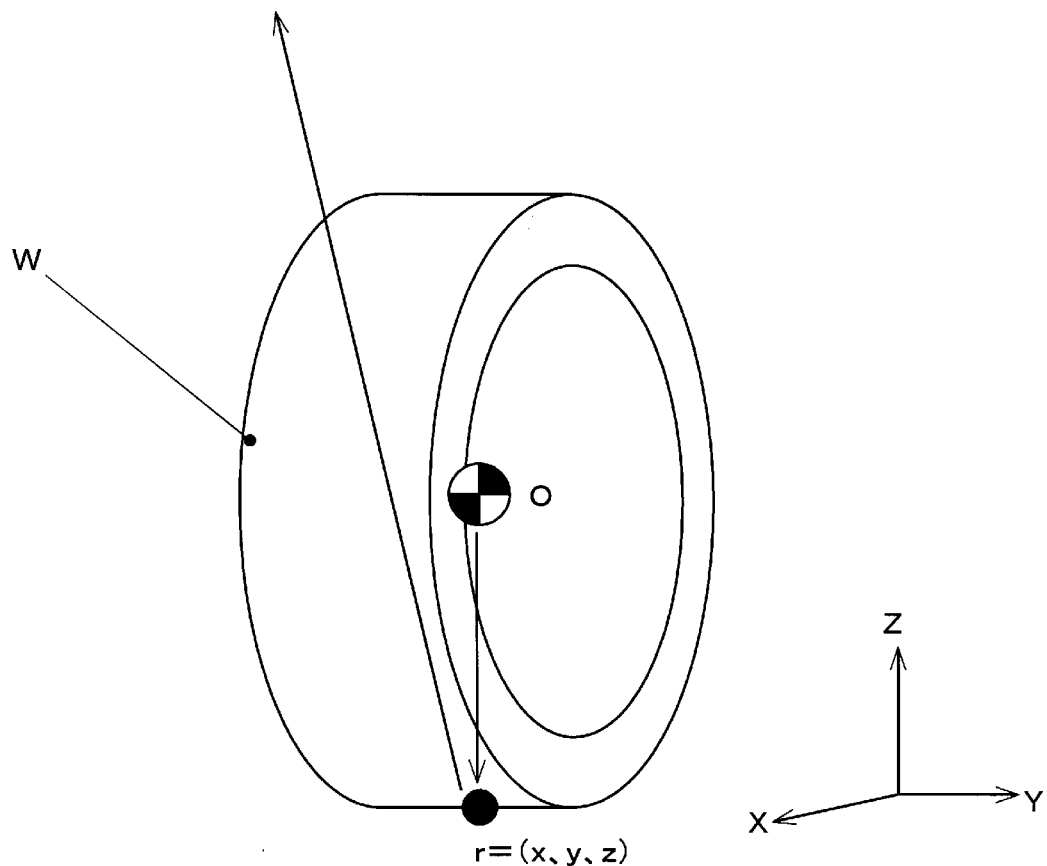
FIG. 7 is a diagram schematically illustrating a wheel center of a wheel, a center of a tire-ground contact load, and an acting force thereof.

FIG. 7 is a diagram schematically illustrating the wheel center of the wheel, the center of the tire-ground contact load, and an acting force thereof.

First, the six-component forces detected at a wheel center O of the wheel, the six-component forces at the center of the tire-ground contact load, and the like are defined as follows.

Six-component forces observed at the wheel center O:

$$F=(F_X, F_Y, F_Z), M=(M_X, M_Y, M_Z)$$

Six-component forces at the center of the tire-ground contact load:

$$Ft=(Ft_X, Ft_Y, Ft_Z), Mt=(Mt_X, Mt_Y, Mt_Z)$$

It is assumed that the wheel center is the origin and that a position vector of the center of the tire-ground contact load is r=(x, y, z).

It is also assumed that no external force acts except on a tire ground contact surface. Then, Equation 1 is obtained.

$$F=Ft \quad (1)$$

Further, from the definition of a moment, Equation 2 is satisfied.

$$M=r\times Ft+Mt \quad (2)$$

Here, unknown numbers and known numbers are summarized below.

It is assumed that a camber angle is in a sufficiently small range. Then, z=−R where R is a tire dynamic radius and a positive value.

A point where $Mt_x=Mt_y=0$ is defined as the center of the ground contact load.

Therefore, there are three unknown numbers, x, y, and $Mt_z$.

When Equation 2 is summarized for unknown numbers, the center of the tire-ground contact load x and y and $Mt_z$ at that point can be obtained as in Equation 3.

$$\begin{pmatrix} x \\ y \\ M_{t_Z} \end{pmatrix} = \begin{bmatrix} 0 & F_{t_Z} & 0 \\ -F_{t_Z} & 0 & 0 \\ F_{t_Y} & -F_{t_X} & 1 \end{bmatrix}^{-1} \begin{pmatrix} M_X - RF_{t_Y} \\ M_Y + RF_{t_X} \\ M_Z \end{pmatrix} \quad (3)$$

Next, the operation of the estimation device of the embodiment will be described.

Figure 8:
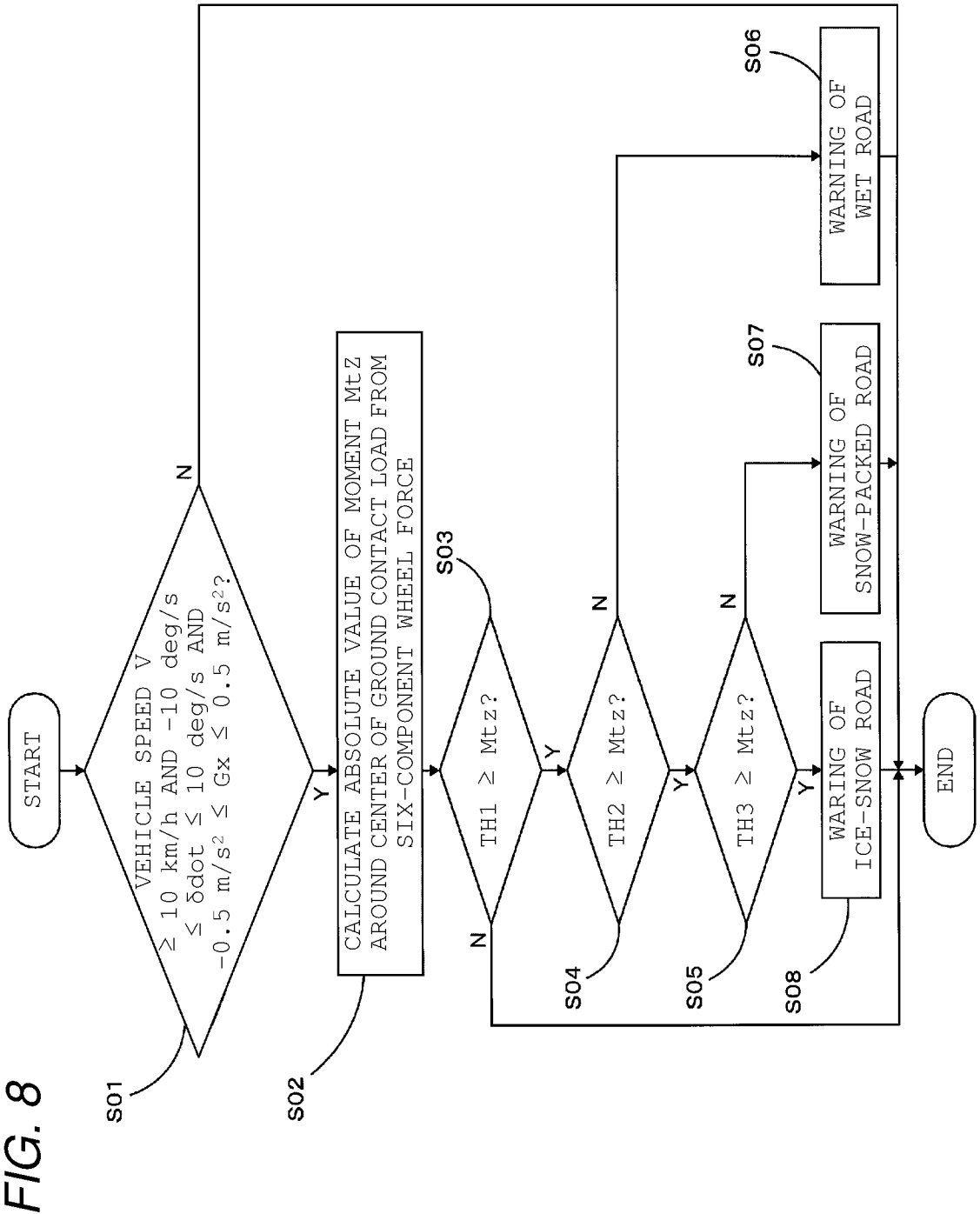
FIG. 8 is a flowchart of operations of the estimation device and the steering device of the embodiment.

FIG. 8 is a flowchart of the operations of the estimation device and the steering device of the embodiment.

Hereinafter, the operations will be described step by step.

Step S01: Determine Vehicle Speed, Steering Speed, and Acceleration

The friction coefficient estimation unit 300 acquires information on a vehicle speed V and a steering speed (that is, a derivative of a steering angle with respect to time) δdot based on information from the steering control unit 90 and the vehicle speed sensor 310.

The vehicle speed V is differentiated with respect to time to obtain a front-rear acceleration Gx of the vehicle.

Alternatively, the front-rear acceleration may be detected using, for example, an acceleration sensor.

As prerequisites for estimating the friction coefficient, the friction coefficient estimation unit 300 determines whether the vehicle speed V is a predetermined value (for example, 10 km/h) or more, the steering speed δdot is −10 deg/s or more and 10 deg/s or less, and the front-rear acceleration Gx is in −0.5 m/s² or more and 0.5 m/s² or less.

If the conditions are satisfied, the process proceeds to Step S02. If the conditions are not satisfied, a series of processes is ended (returned).

Step S02: Calculate Moment $Mt_Z$ Around Center of Ground Contact Load from Six-Component Wheel Force The friction coefficient estimation unit 300 uses the above-mentioned method to calculate (i) coordinate positions x and y of the centers of the tire-ground contact loads of the right and left front wheels and (ii) the moments $Mt_Z$ around the vertical axes passing through the centers of the tire-ground contact loads, based on the output of the six-component force detecting device 200.

For example, the output of the six-component force detecting device 200 is subjected to a low-pass filter process having a cutoff frequency of 5 Hz.

Here, a third-order Butterworth filter may be used as the low-pass filter.

By performing this low-pass filter process, it is possible to reduce the influence of irregularities such as seams and roughness of the road surface.

After that, the process proceeds to Step S03.

Step S03: Compare Moment $Mt_Z$ with Threshold Value 1

The friction coefficient estimation unit 300 compares the moment $Mt_Z$ calculated in Step S02 with a predetermined threshold value 1 (TH1) that is set based on a moment $Mt_Z$ obtained when the vehicle travels on a dry paved road surface which is a reference road surface.

The threshold value 1 is a threshold value used for distinguishing between a dry paved road surface and a wet paved road surface.

When the moment $Mt_Z$ is the threshold value 1 or less, the process proceeds to Step S04; otherwise, a series of processes is ended (returned).

Step S04: Compare Moment $Mt_Z$ with Threshold Value 2

The friction coefficient estimation unit 300 compares the moment $Mt_Z$ calculated in Step S02 with a predetermined threshold value 2 (TH2) that is set based on a moment $Mt_Z$ obtained when the vehicle travels on the dry paved road surface which is the reference road surface.

The threshold value 2 is a threshold value used for distinguishing between the wet paved road surface and a snow-packed road surface.

When the moment $Mt_Z$ is the threshold value 2 or less, the process proceeds to Step S05; otherwise, the process proceeds to Step S06.

Step S05: Compare Moment $Mt_Z$ with Threshold Value 3

The friction coefficient estimation unit 300 compares the moment $Mt_Z$ calculated in Step S02 with a predetermined threshold value 3 (TH3) that is set based on the moment $Mt_Z$ obtained when the vehicle travels on the dry paved road surface which is the reference road surface.

The threshold value 3 is a threshold value used for distinguishing between the snow-packed road surface and an ice-snow road surface.

When the moment $Mt_Z$ is threshold value 3 or less, the process proceeds to Step S08; otherwise, the process proceeds to Step S07.

Step S06: Warning of Wet Road

The friction coefficient estimation unit 300 causes the information notification device 301 to notify the user of information that warns that the road surface on which the vehicle is traveling is a wet road.

Further, the friction coefficient estimation unit 300 transmits, to the steering control unit 90, information indicating that the friction coefficient of the road surface decreases to an equivalent of the wet road. The steering control unit 90 changes a content of a generation force control of the actuator unit 80 as necessary.

For example, the steering control unit 90 performs control that limits a tire force, a steering angle, a steering speed, a yaw rate of a vehicle body, and the like so that none of slip of the tire, an excessive understeer behavior of the vehicle, and an oversteer behavior occurs on a wet road (the same is true for Steps S07 and S08).

After that, a series of processes is ended (returned).

Step S07: Warning of Snow-Packed Road

The friction coefficient estimation unit 300 causes the information notification device 301 to notify the user of information that warns that the road surface on which the vehicle travels is a snow-packed road.

Further, the friction coefficient estimation unit 300 transmits, to the steering control unit 90, information indicating that the friction coefficient of the road surface decreases to an equivalent of the snow-packed road. The steering control unit 90 changes the content of the generation force control of the actuator unit 80 as necessary.

After that, a series of processes is ended (returned).

Step S08: Warning of Ice-Snow Road

The friction coefficient estimation unit 300 causes the information notification device 301 to notify the user of information that warns that the road surface on which the vehicle travels is the ice-snow road.

Further, the friction coefficient estimation unit 300 transmits, to the steering control unit 90, information indicating that the friction coefficient of the road surface decreases to an equivalent of the ice-snow road. The steering control unit 90 changes the content of the generation force control of the actuator unit 80 as necessary.

After that, a series of processes is ended (returned).

For example, the threshold values 1 to 3 may be set in advance at shipment of a vehicle from a factory. However, for example, the moment $Mt_Z$ is also changed by wear of tire, a change in air pressure, replacement of tire, a change in scrub radius due to a change in rim inset, a minute change in geometry due to aging of suspension bush, and the like.

Therefore, in the present embodiment, for example, the dry paved road surface is used as the reference road surface. The moments $Mt_Z$ at the dry paved road surface are learned sequentially, so that the threshold values 1 to 3 are learned and corrected.

Figure 9:
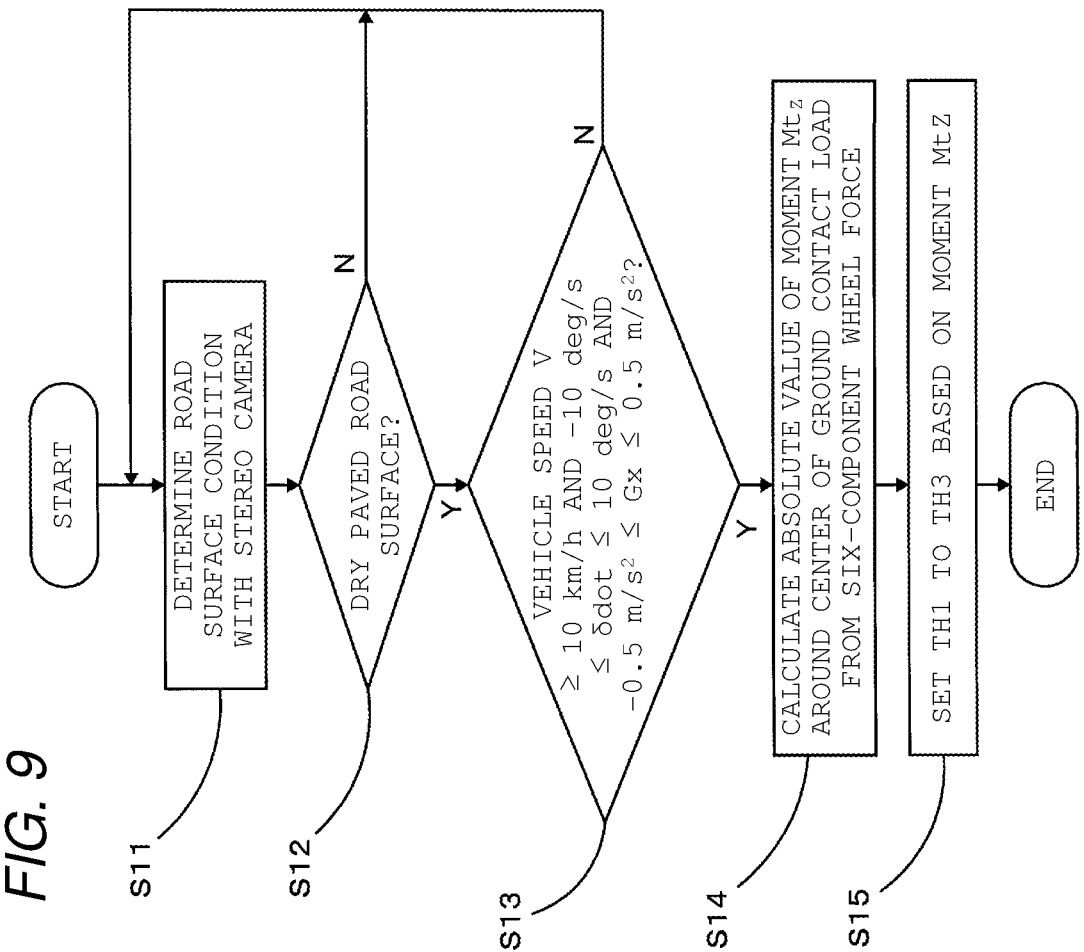
FIG. 9 is a flowchart of learning and correcting of a threshold value in the estimation device of the embodiment.

FIG. 9 is a flowchart of learning and correcting of the threshold values in the estimation device of the embodiment.

Hereinafter, the operations will be described step by step.

Step S11: Determine Road Surface Condition with Stereo Camera

The friction coefficient estimation unit 300 determines a type of a road surface on which the vehicle is currently traveling based on the information (recognition result of the stereo camera device 321) from the environment recognition unit 320.

After that, the process proceeds to Step S12.

Step S12: Determine whether Road Surface is Dry Paved Road Surface

The friction coefficient estimation unit 300 determines whether the road surface on which the vehicle is currently traveling is the dry paved road surface, which is the reference for estimation of a friction coefficient of a road surface.

When the friction coefficient estimation unit 300 determines that the road surface is the dry paved road surface, the process proceeds to Step S13; otherwise, the process returns to Step S11 and subsequent processes are repeated.

Step S13: Make Determination on Vehicle Speed, Steering Speed, and Acceleration

Similar to Step S01, as the prerequisites for estimating the friction coefficient, the friction coefficient estimation unit 300 determines whether the vehicle speed V is the predetermined value (for example, 10 km/h) or more, the steering speed δdot is −10 deg/s or more and 10 deg/s or less, and the front-rear acceleration Gx is −0.5 m/s² or more and 0.5 m/s² or less.

When the friction coefficient estimation unit 300 determines that the conditions are satisfied, the process proceeds to Step S14; otherwise, the process returns to Step S11 and subsequent processes are repeated.

Step S14: Calculate Moment $Mt_Z$ around Center of Ground Contact Load from Six-Component Wheel Force Similar to Step S02, the friction coefficient estimation unit 300 calculates (i) the coordinate positions x and y of the centers of the tire-ground contact loads of the right and left front wheels and (ii) the moments $Mt_Z$ around the vertical axes passing the centers of the tire-ground contact loads, based on the outputs of the six-component force detecting devices 200.

After that, the process proceeds to Step S15.

Step S15: Set Threshold Values 1 to 3 Based on Moment $Mt_Z$

The friction coefficient estimation unit 300 sets the threshold values 1 to 3 used for estimating the friction coefficient of the road surface, based on the moment $Mt_Z$ obtained in Step S14.

For example, the threshold values 1 to 3 may be set by multiplying the moment $Mt_z$ by preset coefficients.

After that, a series of processes is ended.

As described above, according to the present embodiment, the following effects can be obtained.
  (1) By estimating the friction coefficient based on the moment $Mt_z$ around the vertical axis at the center of the tire-ground contact load, for example, even during the normal traveling where the tire force is small (for example, when the vehicle is traveling straight at a constant speed), the friction coefficient of the road surface can be estimated appropriately with a small time response delay.
  (2) By comparing the threshold values 1 to 3 which are set based on the moment $Mt_z$ acquired when the vehicle is traveling on the dry paved road surface with the latest acquired moment $Mt_z$, the friction coefficient of the currently traveling road surface can be estimated appropriately.
  (3) By employing the moment $Mt_z$ obtained when the stereo camera device 321 recognizes that the vehicle travels on the dry paved road surface as a reference and setting the threshold values 1 to 3 based on the moment $Mt_z$, the determination condition can learned and corrected accurately.
  (4) By notifying the user when it is estimated that the vehicle is traveling on either one of the wet road, the snow-packed road, and the ice-snow road, the user can recognize a situation where the friction coefficient is low, and thus, the user is prompted to carefully drive the vehicle, and safety can be improved.
  (5) When the friction coefficient of the road surface is low, for example, the generation control of the actuator unit 80 is changed so that none of an excessive slip angle and an excessive yaw rate occurs. Thereby, traveling stability of the vehicle is ensured, and the safety can be improved.

The embodiment of the disclosure is not limited to the embodiments described above, but various modifications and changes may be made, which are also within a technical scope of the disclosure.
  (1) The configurations of the estimation device, the steering device, and the vehicle are not limited to those of the above-described embodiment, but may be appropriately changed.
  (2) The configuration of the sensor (six-component force detecting device 200 in the embodiment) for detecting the wheel acting force is an example, and the structure of the sensitive body and the arrangement of the strain sensors may be appropriately changed.
  (3) In the embodiment, the output of the estimation device is used for controlling the steering device, but the estimation result of the friction coefficient of the road surface may be used for other purposes.

For example, the estimation result may be used for controlling a driving/braking force generator, an anti-lock brake device, and a behavior control device, and the like. Further, when the vehicle is autonomously driven, the estimation result may be used for changing contents of a self-driving scenario including a target travel locus and a target vehicle speed of the self-driving vehicle.
  (4) A method of recognizing the reference road surface is not limited to the method using the stereo camera device as in the present embodiment, and may be appropriately changed.

For example, when the own vehicle is traveling on a paved road surface based on information on a position of the host vehicle and map data, if a raindrop sensor does not detect raindrops or if it is determined based on weather information that it does not rain, the road surface may be recognized as the dry paved road surface.

A moment due to some acting forces is almost always generated around a vertical axis passing through a center of a ground contact load on a wheel (tire). This moment correlates with a friction coefficient of a road surface.

According to the embodiment of the disclosure, by estimating the friction coefficient based on the moment around the vertical axis at the center of the tire-ground contact load center which correlates with the friction coefficient of the road surface, for example, the friction coefficient of the road surface can be appropriately estimated even during the normal traveling where the tire force is relatively small (for example, when the vehicle is traveling straight at a constant speed).

Further, by estimating the friction coefficient of the road surface based on the acting force on the wheel, for example, the time response delay is small with respect to estimating of the friction coefficient of the road surface based on the behavior on the spring of the vehicle, and further, since a fast Fourier transform process is not used. Therefore, a calculation load can be reduced and a configuration of the device can be simplified.

According to the embodiment of the disclosure, the friction coefficient of the currently traveling road surface can be appropriately estimated based on the moment obtained when the vehicle travels on a reference road surface (for example, a dry paved road surface) and the latest obtained moment.

According to the embodiment of the disclosure, it is possible to appropriately recognize that the vehicle is traveling on the reference road surface, detect the moment when the vehicle travels on the reference road surface, and accurately learn and correct the determination condition.

According to the embodiment of the disclosure, the user can recognize the situation where the friction coefficient is low, and thus, the user is prompted to carefully drive the vehicle, and safety can be improved.

According to the embodiment of the disclosure, when the friction coefficient of the road surface is low, for example, by changing the generation force control of the actuator so that none of an excessive slip angle and yaw rate occurs, traveling stability of the vehicle is ensured, and the safety can be improved.

As described above, according to the embodiment of the disclosure, it is possible to provide the estimation device and the steering device capable of appropriately estimating the friction coefficient of the road surface even during the normal traveling in which the time response delay is small and the tire force is small.

The friction coefficient estimation unit 300 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the friction coefficient estimation unit 300 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the friction coefficient estimation unit 300 illustrated in FIG. 1.

The invention claimed is:

1. An estimation device for estimating a friction coefficient of a road surface, the estimation device comprising:
   a sensor configured to detect a force acting on a wheel;
   a moment calculator configured to calculate a moment around a vertical axis at a center of a ground contact load of a tire of the wheel on a basis of an output of the sensor; and
   a friction coefficient estimator configured to estimate the friction coefficient of the road surface with which the tire is in contact, on a basis of the moment.

2. The estimation device according to claim 1, wherein
   the moment includes a first moment and a second moment, the first moment being obtained when a vehicle travels on a reference road surface, the second moment being obtained when the vehicle travels on the road surface a friction coefficient of which is to be estimated, and
   the friction coefficient is estimated on a basis of the first moment and the second moment.

3. The estimation device according to claim 2, further comprising:
   a recognizer configured to recognize a type of the road surface on which the vehicle travels, wherein
   whether the vehicle is traveling on the reference road surface is determined on a basis of a recognition result of the recognizer.

4. The estimation device according to claim 1, further comprising:
   a notifier configured to notify a user when the estimated friction coefficient is a predetermined value or less.

5. The estimation device according to claim 2, further comprising:
   a notifier configured to notify a user when the estimated friction coefficient is a predetermined value or less.

6. The estimation device according to claim 3, further comprising:
   a notifier configured to notify a user when the estimated friction coefficient is a predetermined value or less.

7. A steering device comprising:
   an actuator configured to steer a steering wheel of a vehicle;
   a steering controller configured to control a generation force of the actuator; and
   the estimation device according to claim 1, wherein
   the steering controller changes control of the actuator according to the estimated friction coefficient by the estimation device.

8. A steering device comprising:
   an actuator configured to steer a steering wheel of a vehicle;
   a steering controller configured to control a generation force of the actuator; and
   the estimation device according to claim 2, wherein
   the steering controller changes control of the actuator according to the estimated friction coefficient by the estimation device.

9. A steering device comprising:
   an actuator configured to steer a steering wheel of a vehicle;
   a steering controller configured to control a generation force of the actuator; and
   the estimation device according to claim 3, wherein
   the steering controller changes control of the actuator according to the estimated friction coefficient by the estimation device.

10. A steering device comprising:
    an actuator configured to steer a steering wheel of a vehicle;
    a steering controller configured to control a generation force of the actuator; and
    the estimation device according to claim 4, wherein
    the steering controller changes control of the actuator according to the estimated friction coefficient by the estimation device.

11. A steering device comprising:
    an actuator configured to steer a steering wheel of a vehicle;
    a steering controller configured to control a generation force of the actuator; and
    the estimation device according to claim 5, wherein
    the steering controller changes control of the actuator according to the estimated a friction coefficient by the estimation device.

12. A steering device comprising:
    an actuator configured to steer a steering wheel of a vehicle;
    a steering controller configured to control a generation force of the actuator; and
    the estimation device according to claim 6, wherein
    the steering controller changes control of the actuator according to the estimated friction coefficient by the estimation device.

13. An estimation device for estimating a friction coefficient of a road surface, the estimation device comprising:
    a sensor configured to detect a force acting on a wheel; and
    circuitry configured to
      calculate a moment around a vertical axis at a center of a ground contact load of a tire of the wheel on a basis of an output of the sensor, and
      estimate the friction coefficient of the road surface with which the tire is in contact, on a basis of the moment.

* * * * *